(12) United States Patent
Cheng et al.

(10) Patent No.: US 12,505,675 B2
(45) Date of Patent: Dec. 23, 2025

(54) AUTOMATIC OPTIMIZATION OF OBSTACLE DETECTION

(71) Applicant: Trimble Inc., Sunnyvale, CA (US)

(72) Inventors: Juan Cheng, Sunnyvale, CA (US); Thomas Sterling, Lakewood, CO (US); Ulrich Vollath, Ismaning (DE); Brandon Sights, San Marcos, CA (US)

(73) Assignee: Trimble Inc., Westminster, CO (US)

( * ) Notice: Subject to any disclaimer, the term of this patent is extended or adjusted under 35 U.S.C. 154(b) by 734 days.

(21) Appl. No.: 17/852,015

(22) Filed: Jun. 28, 2022

(65) Prior Publication Data

US 2023/0419681 A1    Dec. 28, 2023

(51) Int. Cl.
*G06V 20/58* (2022.01)
*G01S 13/86* (2006.01)
*G01S 13/89* (2006.01)
*G01S 17/89* (2020.01)

(52) U.S. Cl.
CPC ............ *G06V 20/58* (2022.01); *G01S 13/865* (2013.01); *G01S 13/89* (2013.01); *G01S 17/89* (2013.01)

(58) Field of Classification Search
CPC .......... G01S 7/003; G01S 7/417; G01S 7/292; G01S 7/40; G01S 13/426; G01S 13/867; G01S 13/931; G01S 17/42; G01S 17/86; G01S 17/931; G01S 7/412
See application file for complete search history.

(56) References Cited

U.S. PATENT DOCUMENTS

| | | |
|---|---|---|
| 2004/0093122 A1 | 5/2004 | Galibraith |
| 2006/0125680 A1* | 6/2006 | Thackray ................ G01S 17/86 |
| | | 342/146 |
| 2009/0093959 A1 | 4/2009 | Scherzinger et al. |
| 2010/0169001 A1 | 7/2010 | Scherzinger et al. |
| 2011/0216201 A1 | 9/2011 | Mcandrew et al. |
| 2012/0140203 A1 | 6/2012 | Gusev |
| 2012/0163656 A1 | 6/2012 | Wang et al. |
| 2012/0281200 A1 | 11/2012 | Rindle |
| 2014/0063482 A1 | 3/2014 | Gusev |
| 2014/0233012 A1 | 8/2014 | Gusev |
| 2014/0267700 A1 | 9/2014 | Wang et al. |
| 2015/0153444 A1 | 6/2015 | Nichols et al. |
| 2016/0097849 A1 | 4/2016 | Nichols et al. |
| 2017/0031015 A1 | 2/2017 | Mei et al. |

(Continued)

OTHER PUBLICATIONS

U.S. Appl. No. 17/897,042, Final Office Action mailed on Oct. 2, 2025, 14 pages.

(Continued)

*Primary Examiner* — Akwasi M Sarpong
*Assistant Examiner* — Michael L Burleson
(74) *Attorney, Agent, or Firm* — Kilpatrick Townsend & Stockton LLP

(57) ABSTRACT

Disclosed are techniques for automatically optimizing radar filter parameters. In embodiments, radar sensor data is captured from a radar sensor on a moving machine/vehicle. The radar sensor data is filtered using radar filter parameters to produce filtered radar sensor data. Radar obstacle points are produced from the filtered radar sensor data. Lidar sensor data is captured from a lidar sensor on the moving machine. Lidar obstacle points are produced from the lidar sensor data. The radar filter parameters are optimized using the lidar obstacle points.

12 Claims, 13 Drawing Sheets

(56) References Cited

U.S. PATENT DOCUMENTS

| | | |
|---|---|---|
| 2017/0212215 A1 | 7/2017 | Hellinger et al. |
| 2017/0248693 A1 | 8/2017 | Kim |
| 2017/0356993 A1 | 12/2017 | Lee et al. |
| 2018/0188361 A1 | 7/2018 | Berger et al. |
| 2018/0251961 A1 | 9/2018 | France et al. |
| 2019/0096091 A1 | 3/2019 | Bao et al. |
| 2019/0248290 A1 | 8/2019 | Turk |
| 2019/0249398 A1 | 8/2019 | France et al. |
| 2019/0286924 A1 | 9/2019 | Fujita et al. |
| 2019/0374290 A1 | 12/2019 | Stolka et al. |
| 2021/0046861 A1* | 2/2021 | Li ................... G06V 10/30 |
| 2021/0051317 A1 | 2/2021 | Yan et al. |
| 2021/0110575 A1 | 4/2021 | Hu et al. |
| 2021/0156963 A1* | 5/2021 | Popov .................. G06N 3/045 |
| 2021/0208245 A1 | 7/2021 | Pandey et al. |
| 2021/0215505 A1 | 7/2021 | Castorena Martinez et al. |
| 2021/0278511 A1 | 9/2021 | Krishnan et al. |
| 2021/0303898 A1 | 9/2021 | Wang et al. |
| 2022/0178718 A1 | 6/2022 | Xia et al. |
| 2023/0166758 A1 | 6/2023 | Brandon |
| 2023/0184890 A1 | 6/2023 | Chou et al. |

OTHER PUBLICATIONS

U.S. Appl. No. 17/897,042, Non-Final Office Action mailed on Sep. 9, 2025, 14 pages.

Extended European Search Report for Application No. 23179952. 9-1206, mailed Oct. 30, 2023, 21 pages.

Anonymous: "F-score", Wikipedia, Jul. 15, 2012, pp. 1-2 Retrieved from the Internet: URL: https:/en.wikipedia.org/w/index.php?title= F-score&oldid=502498831 retrieved on Jul. 8, 2021.

* cited by examiner

AUTOMATIC OPTIMIZATION OF OBSTACLE DETECTION

BACKGROUND OF THE INVENTION

An autonomous mobile robotic platform can utilize systems that provide terrain and feature analysis of ground-based information surrounding the robot. This information can facilitate the robot's navigation system to make decisions about where the robot can and cannot go. The robot can thus avoid obstacles, which may be humans, other robots or vehicles, or stationary obstructions. As used herein, "robot" includes driver-assisted or autonomous vehicles/machines.

Some conventional spatial determination systems employ laser scanning, such as Light Detection and Ranging (LIDAR) systems. One drawback of these conventional systems, and laser scanning in general, is the inherent cost of system components due to the high precision nature of the technology. By way of example, conventional laser systems typically produce vast amounts of data requiring high levels of processing capability. In order to process and utilize the amounts of data generated by laser scanning, commercial systems require specific system components, such as laser processing chip-sets. As a result, there is an increased cost to customers and manufacturers alike.

In addition to cost, there are other drawbacks of laser scanning systems. For one, conventional laser scanning systems may be highly susceptible to error when in motion. Additional drawbacks may be due to the operational frequency of beams employed in a scanning system. Those frequencies may not penetrate fog, rain, smoke and other environmental conditions.

Radar performs better in bad weather, and radar obstacle detection chips for use in vehicles are commercially available and less expensive than Lidar systems. However, radar has lower resolution and is more susceptible to noise. To deal with noise, some radar chips for obstacle detection include various filters, such as a signal-to-noise (SNR) filter, a spatial filter, a geometric filter and a temporal filter. The spatial filter deals with the closeness in space of several returns received at almost the same time, to give one return. The geometric filter can be used to filter out certain spaces, such as the ground in front of a robot or vehicle. A temporal filter can be used to filter out apparently detected objects moving faster than practical, such as faster than the speed of light. Other filters can also be included, such as a bandpass filter around the radar frequency. These filters can be tuned with parameters appropriate for the particular application and conditions.

Some have proposed combining radar and lidar data to provide a combined point cloud to identify potential obstacles. See, e.g., US Pub. Nos. 20170248693 and 20170031015. However, such a combination is more expensive, continuously requiring the lidar processing in addition to the radar processing. Also, it may provide more noise with the data.

It would be desirable to use a less expensive radar system that can perform in bad weather, but one with improved accuracy. As such, new systems, methods, and other techniques are needed to address these and other issues.

Unless otherwise indicated herein, the materials described in this section of the Specification are not prior art to the claims in this application and are not admitted to be prior art by inclusion in this section.

BRIEF SUMMARY OF THE INVENTION

A method and apparatus are provided for automatically optimizing radar filter parameters. In embodiments, radar sensor data is captured from a radar sensor on a moving machine. The radar sensor data is filtered using radar filter parameters to produce filtered radar sensor data. Radar obstacle points are produced from the filtered radar sensor data. Lidar sensor data is captured from a lidar sensor on the moving machine. Lidar obstacle points are produced from the lidar sensor data. The radar filter parameters are optimized using the lidar obstacle points.

In embodiments, the optimizing includes determining spatial filter bounding areas for obstacles identified by the lidar obstacle points. Radar obstacle points detected inside the spatial filter bounding areas are identified as true positives. The radar filter parameters are optimized to maximize the number of true positives and minimize the number of false positives.

In one embodiment, the radar sensor filter parameters are optimized for at least a signal-to-noise (SNR) filter and a spatial-temporal filter. In embodiments, the optimization is performed by sweeping through SNR parameters first, then spatial filter parameters, then temporal parameters. In embodiments, the temporal parameters include a minimum delta time, a maximum time decay, a time decay rate, a first ring scale and a second ring scale. In embodiments, additional filter parameters include a maximum distance, a grid width, and a grid depth. In embodiments, obstacle points outside an area of interest and not within both a radar FOV and a lidar FOV 304 are not processed. In embodiments, the optimizing includes determining a F1 score as the harmonic mean of precision and recall, maximizing both precision and recall, and applying a beta factor that shifts the importance in favor of recall.

This summary is not intended to identify key or essential features of the claimed subject matter, nor is it intended to be used in isolation to determine the scope of the claimed subject matter. The subject matter should be understood by reference to appropriate portions of the entire specification of this disclosure, any or all drawings, and each claim.

The foregoing, together with other features and examples, will be described in more detail below in the following specification, claims, and accompanying drawings.

The terms and expressions that have been employed are used as terms of description and not of limitation, and there is no intention in the use of such terms and expressions of excluding any equivalents of the features shown and described or portions thereof. It is recognized, however, that various modifications are possible within the scope of the systems and methods claimed. Thus, although the present system and methods have been specifically disclosed by examples and optional features, modification and variation of the concepts herein disclosed should be recognized by those skilled in the art, and that such modifications and variations are considered to be within the scope of the systems and methods as defined by the appended claims.

BRIEF DESCRIPTION OF THE DRAWINGS

The accompanying drawings, which are included to provide a further understanding of the disclosure, are incorporated in and constitute a part of this specification, illustrate embodiments of the disclosure and together with the detailed description serve to explain the principles of the disclosure. No attempt is made to show structural details of the disclosure in more detail than may be necessary for a fundamental understanding of the disclosure and various ways in which it may be practiced.

DETAILED DESCRIPTION OF THE INVENTION

Figure 1:
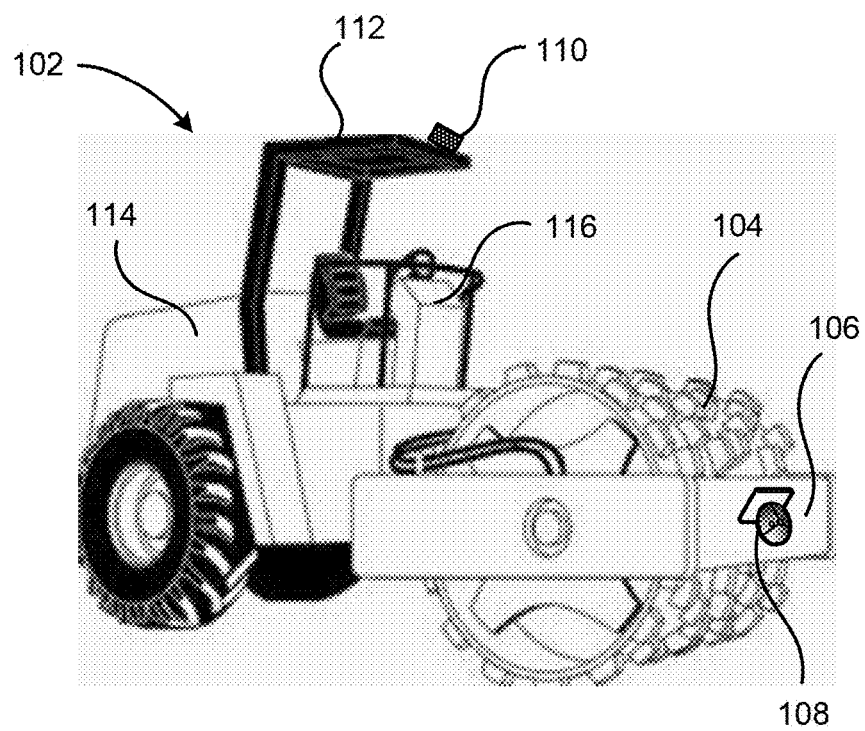
FIG. 1 illustrates the placement of Lidar and radar sensors on a vehicle with a soil compactor, according to embodiments.
Figure 2:
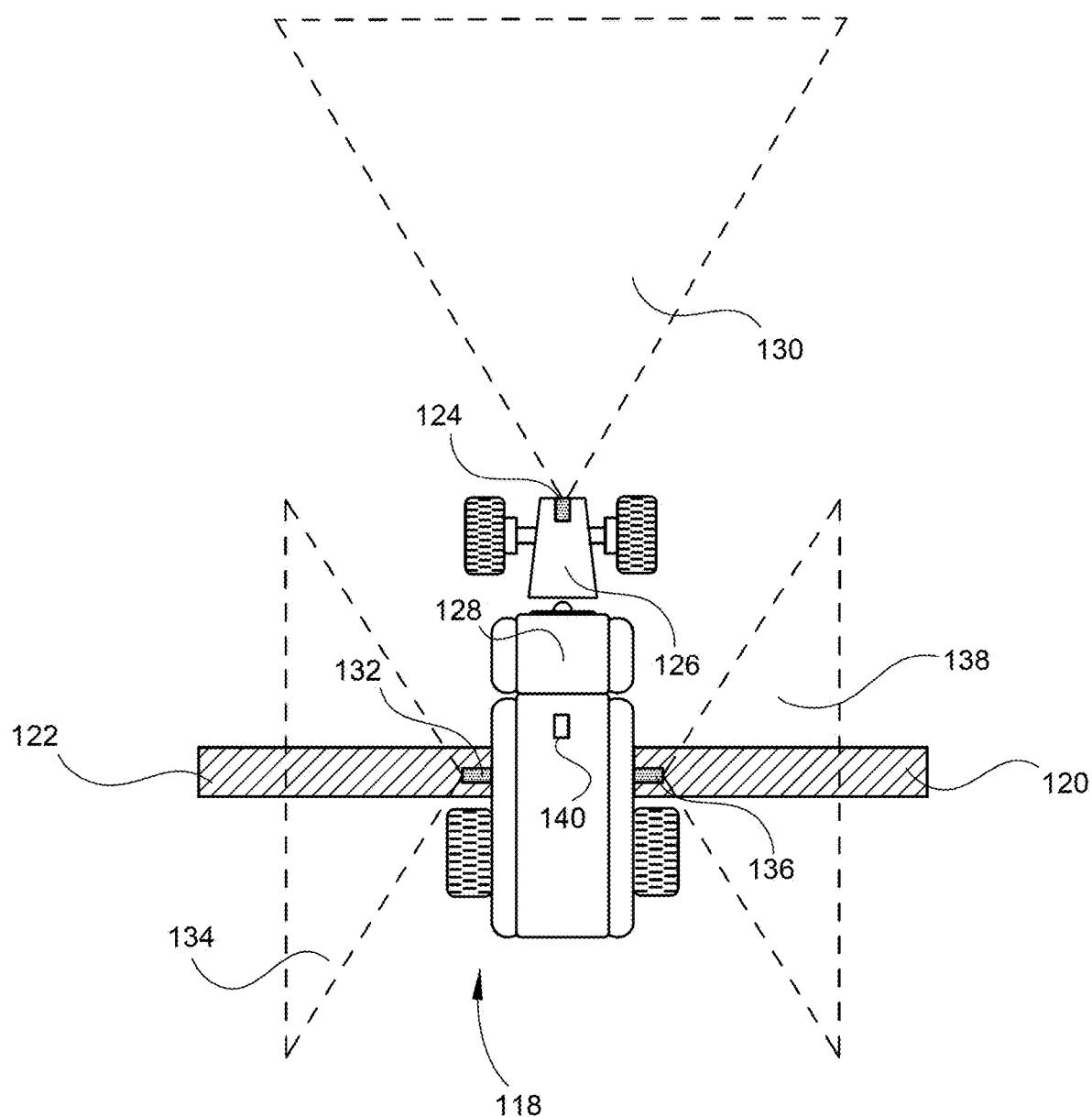
FIG. 2 illustrates another example of a vehicle with multiple radar sensors, according to some embodiments.
Figures 3A, 3B:
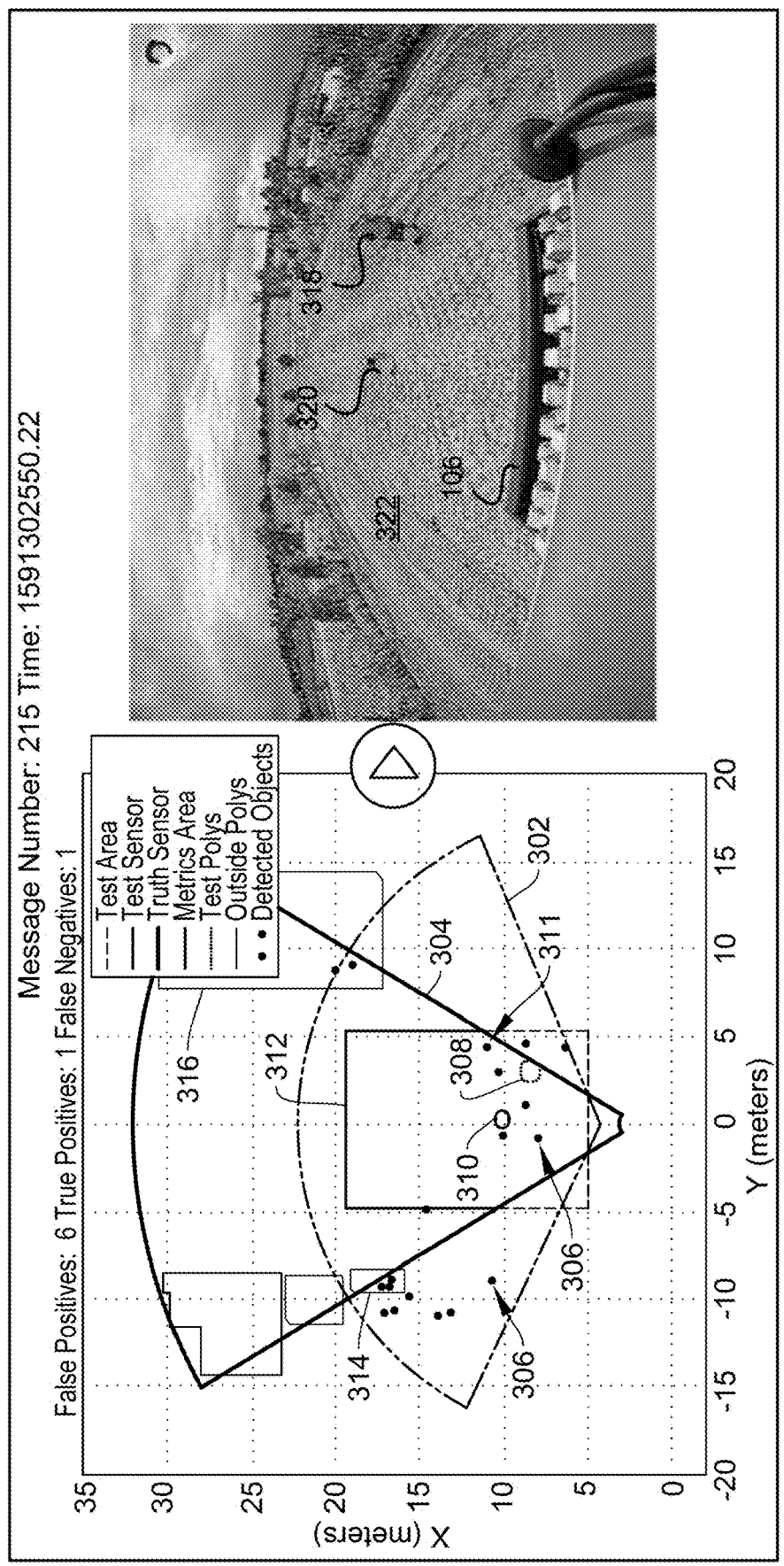
FIGS. 3A-B illustrate a plot of detected radar and lidar points and the corresponding camera image, according to some embodiments.

In embodiments, radar and Lidar sensors are mounted on a moving machine as shown in FIGS. 1-2. The overlapping fields of view are shown in FIGS. 3A-B. As shown in FIGS. 4 & 9-12, radar filter parameters are optimized using detected lidar obstacle points.

Location of Radar and Lidar on Vehicles

FIG. 1 shows an example vehicle 102 with a soil compactor attached thereto. The soil compactor includes a roller 104 attached to a frame 106. A radar sensor 108 is attached to the front of the frame 106. A LiDAR sensor 110 is attached to a roof 112 of vehicle 102. Frame 106 and compactor 104 can move laterally with respect to cab 114. A console 116 includes a computer and other sensors, including an odometer and a potentiometer at the connection with frame 106 to detect its lateral movement. Other examples of vehicles with articulated segments can include a sprayer with boom arms, a harvester with a header, vehicles with a front or rear hitch, and the like. Embodiments of the invention are applicable to all of such vehicles, as well as other vehicles without articulated segments, such as cars, trucks, boats, aircraft, drones, etc.

In one embodiment, LiDAR sensor 110 of FIG. 1 is mounted high on the roof 112 to give it a wide and deep field of view (FOV), unobstructed by parts of the vehicle 102. In one embodiment, LiDAR sensor 110 provides a 180 or 360 degree view through the use of scanning mirrors, a rotating mount, or a solid-state mechanism. Radar sensor 108 is mounted closer to the ground, and angled upward to enable detection of people and objects above the ground without interference from ground detection. In one embodiment, the radar sensor is the SmartMicro Type 153 Radar sensor. In one embodiment, the lidar sensor is the Cepton P60 Lidar sensor, or the Ouster OSO-128 Lidar sensor.

FIG. 2 illustrates another example of a vehicle with multiple radar sensors, according to some embodiments. The vehicle 118 is a sprayer that includes two booms 120 and 122 attached to either side of the vehicle 118. A first radar sensor 124 is positioned at the front of an engine hood 126, which is laterally movable for steering with respect to a cab 128. Radar sensor 124 has a FOV 130 directed toward the front. A second radar sensor 1130 is positioned at the left side of the vehicle 118 and has a FOV 134 directed toward the left. A third radar sensor 136 is positioned at the right side of the vehicle 118 and has a FOV 138 directed toward the right. A LiDAR sensor 140 is mounted on the roof of vehicle 118 with a 360 degree field of view.

Radar and Lidar FOVs

FIGS. 3A-B illustrate a plot of detected radar and lidar points and the corresponding camera image, according to some embodiments. FIG. 3A shows a plot with objects detected in a radar FOV 302 and a lidar FOV 304. Note that radar FOV 302 is wider, but lidar FOV is deeper. Also, since radar FOV 302 is attached to moving compactor frame 106, the radar FOV 302 may move side-to-side relative to lidar FOV 304. The points, such as points 306, indicate possible objects detected by radar. Shapes 308 and 310 show shapes detected by lidar. Radar provides less information about the shape of the object, just providing one or more detected points on each object. Lidar, on the other hand, is much more precise with much more data, providing a large number of pixels which give an outline of the object shape.

While the radar provides less information, it has a number of advantages over lidar. Radar is essentially weatherproof. It can work in a bad weather or severe environmental conditions, like rain, snow, mist, spray, dust, etc. Lidar, on the other hand, has a degraded signal in such conditions. Radar is relatively cheap compared to Lidar sensors. Most radars use solid state technology, with no moving parts, and therefore have much higher resistance to errors due to shock and vibration, such as occurs with farm and construction equipment. Since lidar produces large point clouds, radar has less data which is easier and faster to process. This allows a system to detect obstacles faster, or with less processing power.

As shown in FIG. 3A lidar shape 308 is solid to indicate that it overlaps with a radar point. Thus, both systems agree there is an object there, giving a "true positive." Lidar shape 310 is an outline, not solid, indicating there is no overlapping radar object detected. Since the lidar is more accurate, and the data is from a sunny day without dust, spray or other conditions that degrade lidar, the lidar data is presumed to be the accurate data, and thus the "ground truth" (the correct representation of the environment). Thus, shape 310 indicates a "false negative" for the radar, where the radar missed an object. The other points not overlapping with a lidar shape, such as point 311, are "false positives."

FIG. 3B shows a camera image of the same scene as FIG. 3A, with a person 318 corresponding to true positive 308 of FIG. 3A, and a fixed object (cone) 320 corresponding to false negative 310. A road 322 is an area of interest for the compactor.

A rectangle 312 in FIG. 3A corresponds to an area of interest. That may be the road 322 of FIG. 3B, or may be the current and/or anticipated trajectory of vehicle 102. In embodiments, to simplify and speed calculations, points and shapes outside area of interest 312 are ignored and not processed. Also, points and shapes that are not within both the radar FOV 302 and the lidar FOV 304 are ignored and not processed. Bounding boxes 314 and 316 group points that likely belong to the same object, and will be described below.

Optimization Feedback

Figure 4:
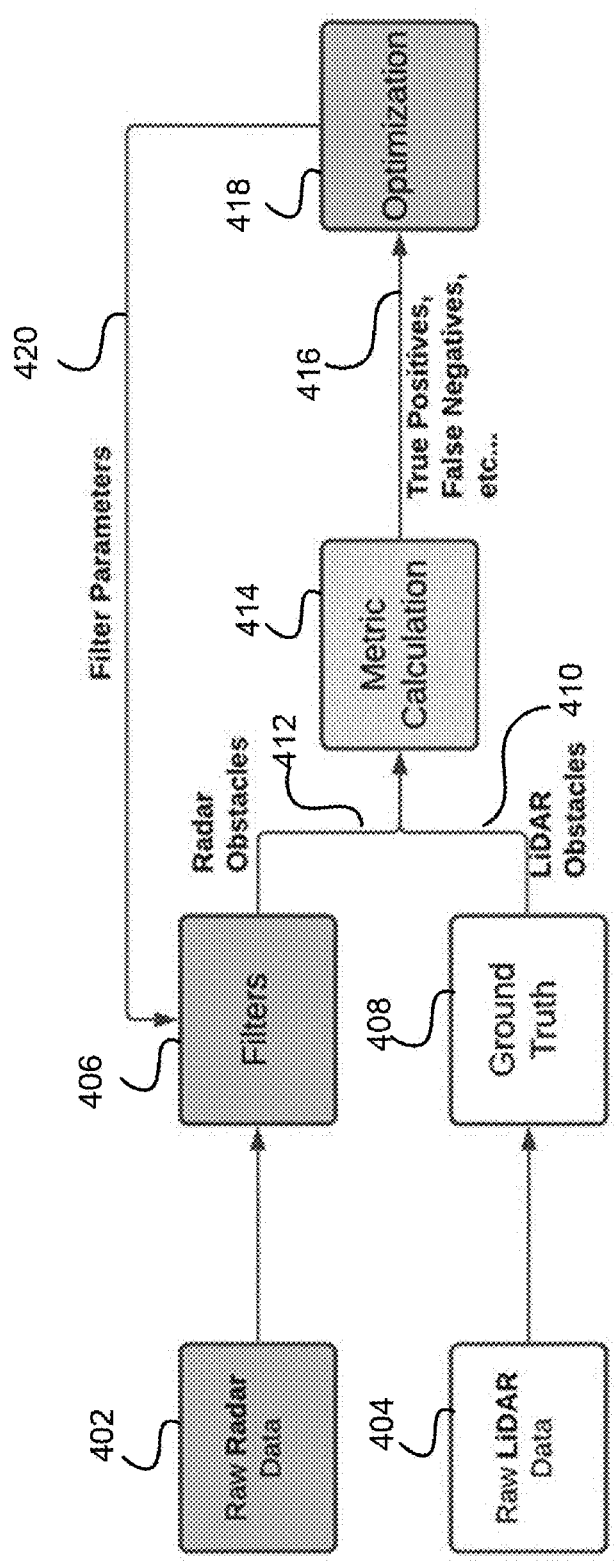
FIG. 4 is a high-level block diagram of an optimization system for tuning radar filters according to embodiments.

FIG. 4 is a high-level block diagram of an optimization system for tuning radar filters according to embodiments. As used herein, tuning refers to adjusting the filter parameters and optimizing refers to selecting an optimum parameter to which the filter should be tuned or adjusted. A radar sensor provides raw radar data 402, and a Lidar sensor provides raw Lidar data 404. The raw radar data is filtered with various filters that are provided in many radar chip implementations. For example, the SmartMicro Type 153 Radar sensor has a signal-to-noise (SNR) filter and a spatial-temporal filter. A Lidar sensor identifies detected object shapes 408, considered the "ground truth." The detected Lidar obstacles 410 and the detected Radar obstacles 412 are provided to a metric calculation module 414. The overlap of the Lidar and radar detected objects is then calculated, providing output 416 identifying the true positives, false negatives, and false positives. An optimization module 418 then does a simulation of the radar filtering, trying different filter parameters to attempt to maximize the number of true positives. The optimization can be done in a number of ways, such as by sweeping through the SNR parameters first, then the spatial filter parameters, then the temporal parameters. Alternately, two could be adjusted at the same time, or all 3. In other embodiments, less than all of the filters have the parameters adjusted, or additional filters can be used with parameters adjusted.

In one embodiment, the optimization module is on a server in the cloud (over the Internet), with the output 416 being transmitted over the Internet, so that the intense calculations are done with a remote server. In another embodiment, the metric calculation 414 is also done in the cloud. The determined, optimized ideal parameters for tuning the radar filters are then downloaded to the local processor on the vehicle. In one embodiment, this tuning is done periodically, such as once an hour, day, week or month. Also, the data provided for tuning is only collected in ideal environmental conditions, to produce reliable lidar data.

Thus, in one embodiment, while a lidar sensor is used, the extensive and thus expensive lidar calculations are only done periodically, to improve the radar data. In an alternate embodiment, both the lidar and radar data are used and processed to detect objects, with the lidar data also being used to improve the radar data through tuning the radar filters.

In one embodiment, raw radar data is provided to metrics module 414 in addition to the detected radar obstacles. Thus, optimization module 418 can provide a robust adjustment of the filters in more expansive directions as well (letting in more data), to allow determination of the best combination of filter parameters that also provides fewer false negatives.

Spatial Filter

In embodiments, the optimizing includes determining spatial filter bounding areas for obstacles identified by the lidar obstacle points. The spatial filter parameters are the size of the bounding box around the apparent detected position of an object. The bounding box is what is generated at the end of the object detection. In lidar, it is the clustered points, and in the radar data it is the size and shape of the clustered cells around the obstacle detected with sufficient confidence. Radar obstacle points detected inside the spatial filter bounding areas are identified as true positives. The radar filter parameters are optimized to maximize the number of true positives.

Figure 5:
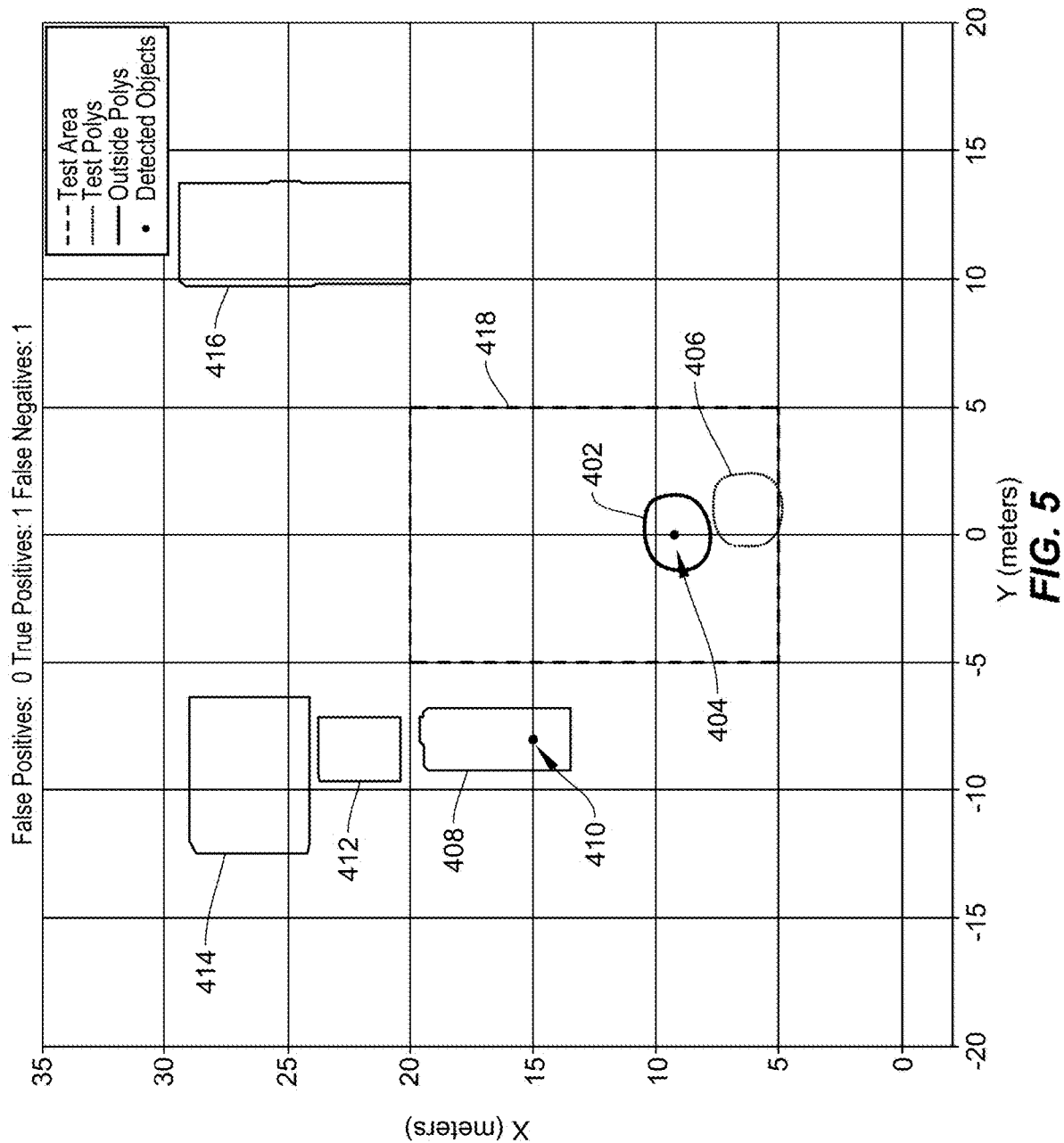
FIG. 5 is a diagram, similar to FIG. 3A, of a grid showing the point cloud detections for the radar and lidar sensors, according to embodiments.

FIG. 5 is a diagram, similar to FIG. 3A, of a grid showing the point cloud detections for the radar and lidar sensors. The points indicate radar detections, and the shapes indicate lidar detections. A lidar shape 402 encloses a radar point 404, and thus radar point 404 is a true positive. A lidar shape 406 does not have a corresponding lidar point, and thus this is a false negative. Lidar shapes 408 includes a radar point 410. Additional lidar shapes 412, 414 and 416 have no corresponding radar points. Lidar shape 408 would be a true positive, but it is out of an area of interest 418, and thus is disregarded. The area of interest can correspond to the area in front of a vehicle, as described earlier. In this example, lidar shapes 408-416 can correspond to vegetation along the sides of a road, for example.

As can be seen, lidar shapes 402 and 406 are rounded, while the other lidar shapes are rectangular. The shapes can correspond to the actual detected lidar object outlines, or a buffer area can be added around the object shapes to capture radar hits that are only slightly off. The buffer can correspond to the object shape, can be round, can be rectangular, or could be any other desired shape.

In one embodiment, the grid is three dimensional. This allows the elimination of the road or small objects on the road which aren't tall enough to be an obstacle, such as gravel, lane markers, etc. This can be done in the background, with a navigation system only being supplied the objects in a 2D grid. In one example, any radar detections below a certain height are eliminated. That height can be set using the more accurate lidar data. The ground points can be determined using either a traditional RANSAC algorithm, or newer difference-of-normals (DON) algorithm combined with minimum/maximum radius checks based on forming a surface on N points closest to the point being checked.

In one embodiment, adjustments are made for different surfaces and materials. For example, different types of gravel or road base may have different noise characteristics. In one embodiment, the operator tells the system what type of material it is operating on. Alternately, the system determines the type of surface automatically via cameras, audible sensors, and/or feedback from compaction sensors.

Figure 6:
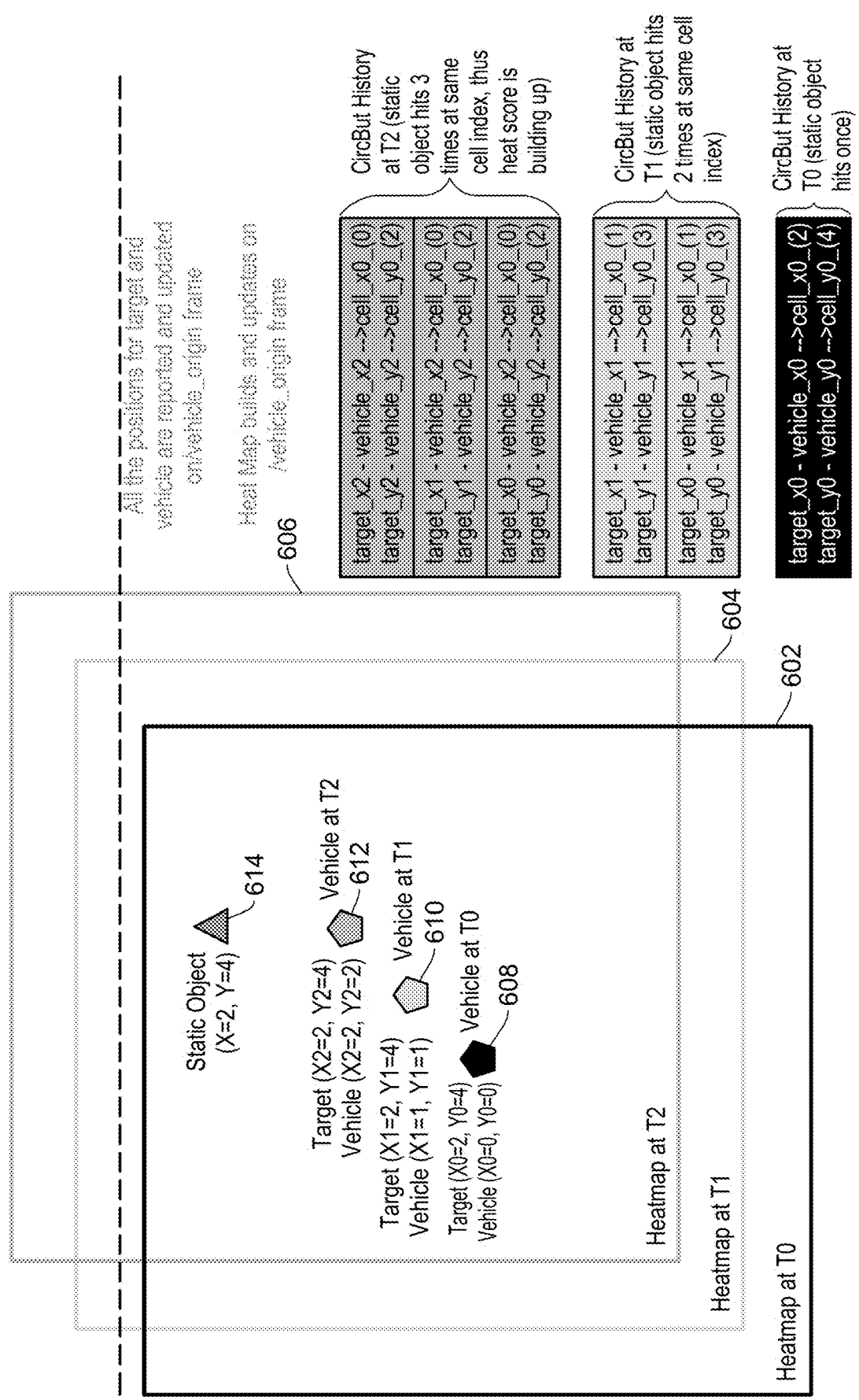
FIG. 6 is a diagram illustrating the change in position over time of an observed object, according to embodiments.

FIG. 6 is a diagram illustrating the change in position over time. Three different grids are shown, grid 602 at time T0, grid 604 at time T1, and grid 606 at time T2. For each grid, the vehicle is in the center, at positions 608, 610 and 614, respectively. A stationary object 616 appears in each grid, and becomes closer due to the vehicle approaching it. The grid is composed of many cells, or pixels. The cell is the minimum size detected. Tuning the cell size would help to reduce the position measurement noise and increase or lower snr detections. A large cell size can cause the whole cell to appear occupied when a signal is received in a small part of it. A smaller cell size provides a more accurate estimate of the size and shape of an object, and thus an indication of whether it is really an object or noise. Tuning the cell size helps segment obstacles more accurately, but can also increase the processing time if the cell size is decreased too much. Tuning the cell size does help reduce the measurement noise, but it cannot change SNR detections, as those are provided by the sensor itself.

Spatial Parameters od_threshold (double, default=0.7): Minimum score (between 0 and 1) threshold for reporting obstacles present} The od_threshold is the obstacle detection threshold. Double is the parameter type, e.g. double floating point precision.

0.7 is a threshold for the confidence required in a cell to determine that an obstacle is there. One can adjust that threshold lower to allow for more obstacles to be detected, and higher to reduce the number of detected obstacles.

Another spatial parameter that can be adjusted is the size of the cell. Smaller cell sizes mean more calculations, but larger cell sizes mean a small object in a portion of the cell will be interpreted as the whole cell being occupied, which could lead to a false positive. In one embodiment, the defaults are as follows:

cell_width_meter (double, default=0.15): Detection cell width in meters cell_depth_meter (double, default=0.15): Detection cell length in meters In one embodiment, the cell size is varied and the number of false positives and false negatives is monitored. The determination of whether something is a false positive or false negative is done by comparing to the more accurate lidar data. The cell size is varied and optimized until a minimum number of false positives and negatives, and a maximum number of true positives is achieved.

Temporal Filter

Lidar detects how fast an object is moving over time, and that is used to place a bound on how fast radar detected objects move within a corresponding lidar bounding box. Radar objects moving faster are eliminated. This can manifest itself in different ways. An object that appears to have moved faster than the expected speed of objects in an environment between two frames of data capture is either noise, and not an object, or is an object that was not detected before. Most Lidar does not detect how fast an object moves, but a tracking algorithm based on lidar can do so.

The temporal filter is based on the assumption that in the real world, things don't appear or disappear immediately at a location. They also don't move faster than the light speed, and a threshold can be set way below that. In one embodiment, a maximum speed of obstacles expected in the environment of interest is set. Depending on the particular environment, that speed may be different. A temporal filter is designed to bridge detection outage, remove single spurious returns and minimize safety risk. In embodiments a heatmap is utilized to work with a temporal filter.

Figure 7:
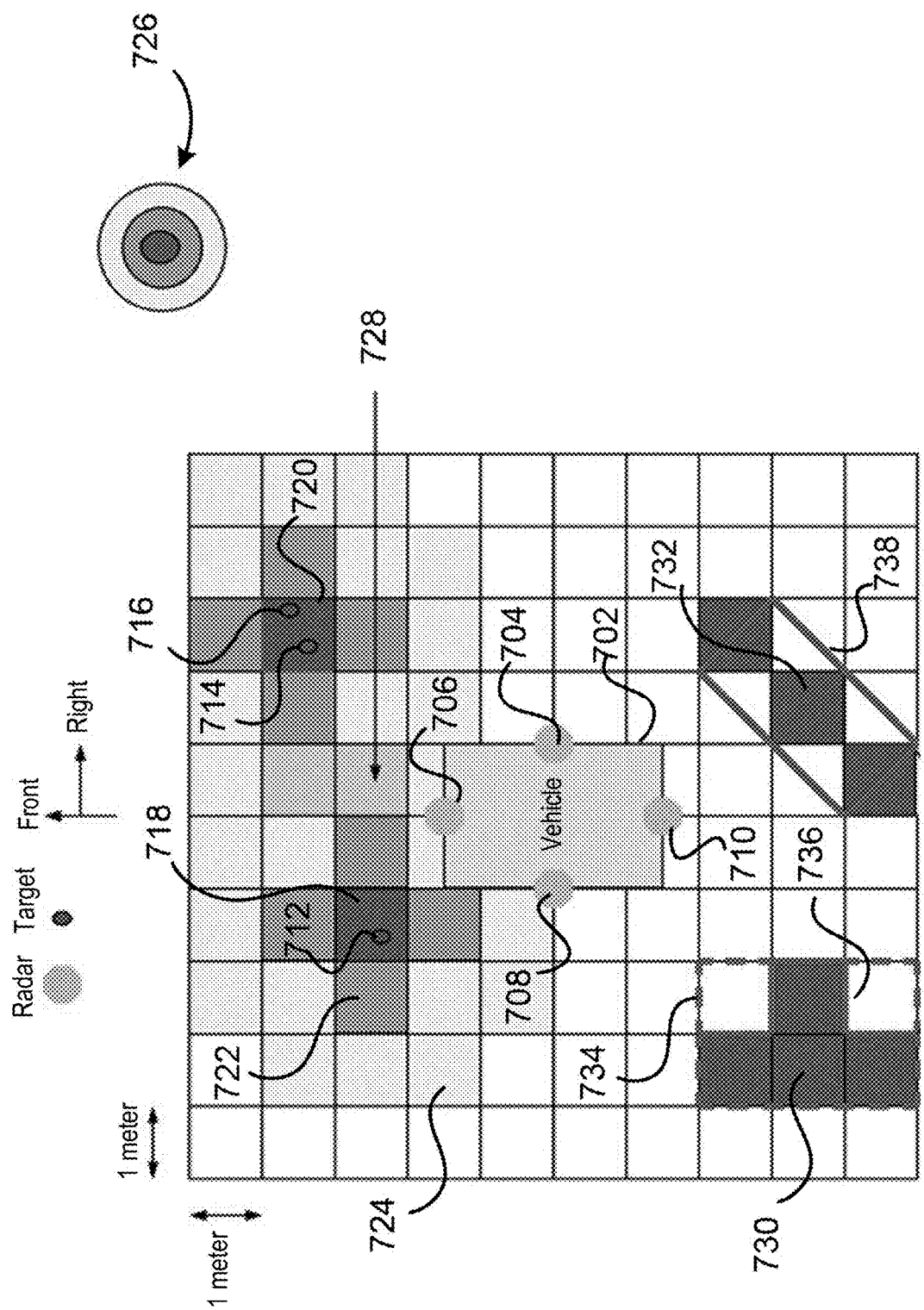
FIG. 7 is a diagram of a heatmap for a temporal filter according to embodiments.

FIG. 7 is a diagram of a heatmap for a temporal filter according to embodiments. The position of a vehicle 702 is shown, with the vehicle having multiple radar sensors 704, 706, 708 and 710 on the four sides of the vehicle. Objects or targets 712, 714 and 716 are detected. The resolution used indicates that target cells 718 and 720 are occupied. Note that while a 10×10 meter grid is shown for illustration, a much finer grid would be used in practice, and the grid size can be configured. Heat is added to target cells with software, producing a series of rings with dissipating heat, indicated by less shading, around the target cells. For example, a cell 722 has less heat than cell 718, while a cell 724 has even less heat. While shown as squares, with a much finer cell size, the heat would appear as a series of heat rings 726. The number or layers of heat rings is determined by the grid cell size. The small the cell size, the more layers are used. When the layers overlap from two targets, a combined heat is shown, illustrated as a darker shade for example overlapping cell 728. When there is an overlap in the same cell location, the heat sums up to give a stronger indication that some obstacle (one of the two) might be there.

The magnitude of the heat indicates the confidence in the detection, based on accumulated data. The target SNR is used to represent the magnitude of heat. The more noise, the more uncertainty in the location, and thus the larger the heat rings. A higher SNR generally gives a higher confidence/probability of an obstacle in a location, but too high of an SNR can also mean noise in the sensor. Adding layered heat rings around the target to analogize heat dissipation, with the heat dissipation indicating reduced likelihood that the target is in such a cell. The software keeps a recent history of detected targets with time-weighted factor. Thus, the weighting eventually goes to zero if the target isn't detected in subsequent scans. The heat decreases with distance from the target (object) and decays over time. Alternate embodiments to using rings can be used, such as a probabilistic 2D or 3D grid, that can process very effectively, especially on graphs processing units (GPU) using convolutions.

A group of 4 object cells 730 and a group of 3 object cells 732 are shown as well. These can be indicated as 7 targets, or grouped as two larger objects. The grouping of objects 730 cold be a simple dotted line rectangle 734, or a more precise solid line 736. The solid line 736 is more computationally intensive, and may not be needed with a fine enough cell size. The group of 3 objects 732 could be roughly indicated by a bounding box 738, The heat map will record the last known location of the target and maintain it for a period of time, thus smoothing out any small detection outages in case the radar missed the target in one scan. The temporal filter parameters can be varied to design a filter to bridge such a detection outage, as well as to remove single spurious returns and minimize the safety risk. In particular, the temporal filter parameters include the following.

Temporal Parameters min_delta_time (double, default=0.25): The farthest back in time that an old radar message can be before its contribution to the current heatmap starts to be weighted down.

max_time_decay (double, default=0.8): Maximum duration (in seconds) of detections kept in history.

time_decay_rate (double, default=0.25): Rate for time decayed score first_ring_scale (double, default=0.0): The heat weighting of the innermost ring around the center point.

second_ring_scale (double, default=0.0): The heat weighting of the outer ring around the center point.

In one embodiment, the ring scales are optimized based on the lidar data by determining the fastest speed at which any lidar detected objects are moving. Thus, the lidar data confirms that anything that seems to be moving faster is noise. The optimum parameter will cause filtering out anything faster than what has been detected, without missing any fast objects. Thus, fewer extraneous computations are needed. The lidar data could also be used to 1) estimate the radar cross section (RCS) of an object that is expect to be received from the radar sensor or 2) help set the parameters of the z-height filter of the radar filter.

SNR (Signal-to-Noise-Ratio) Filter

The signal to noise ratio (SNR) measures the difference in amplitude between the signal and the noise. It is typically expressed in decibels. The noise can come from the environment, or from the radar sensor and the transmitting circuitry.

Figure 8A:
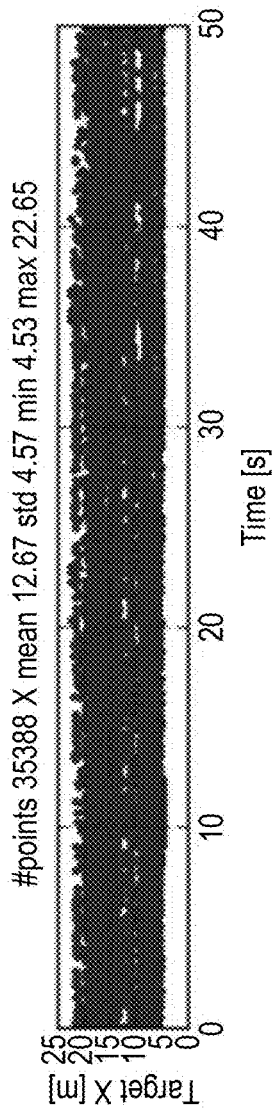
FIG. 8 shows the effect of a noise filter, with FIG. 8A showing the unfiltered radar sensor signal and FIG. 8B showing the radar sensor data after an SNR filter.

FIG. 8 shows the effect of a noise filter, with FIG. 8A showing the unfiltered radar sensor signal for a person walking in front of a vehicle in a zig-zag pattern. The plot of FIG. 8A shows raw radar points, represented by target x positions and target SNR over time. As can be seen, the FIG. 8A radar sensor signal is very noisy. It's hard to see any trends in the x, y positions that would show the walked path.

Figure 8B:
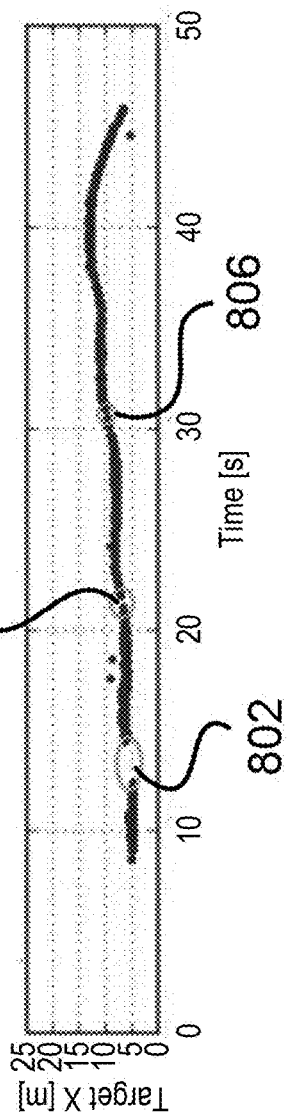

FIG. 8B shows the radar sensor data after an SNR filter. By applying a threshold on the SNR noise floor as shown in the right plot, now the walked path of the target is much clearer, and the SNR filter is very effective. However, a number of gaps 802, 804 and 806 are present in the filtered data in this example. An SNR filter parameter is the minimum SNR, meaning the sensor detector amplitude level below which anything detected is presumed to be noise, and is filtered out. In one embodiment, this minimum SNR (min_snr) is 30 dB by default. Coarse filtering is applied early to discard data quickly. In this case, it is a quick check on the SNR of the target reported by the radar. In addition, filtering is done not on a fixed SNR, but on a variable SNR, based on the range to the target, and the azimuth from the radar transmitter/receiver. As a target gets farther away, the minimum SNR is reduces, and likewise, as the angle to the center of the radar emitter/detector increases.

In one embodiment, the SNR threshold can be optimized by determining how high the threshold can go without missing objects detected by the lidar sensor. The threshold needs to be high enough to filter out most false positives, which again can be gauged by comparing to the more accurate lidar data showing whether there is an object in a cell or not.

Other Parameters

In addition to the particular filters described above, the data can also be filtered with other parameters that can be adjusted to give an optimum performance. Below are some examples.

max_distance (double, default=78.0): Maximum target distance (in meters)

grid_width_meter (double, default=50.0): The total maximum width of the grid we will maintain. Half is to the left of the center of the vehicle, and half to the right.

grid_depth_meter (double, default=50.0): The total maximum depth of the grid we will maintain. Half is forward off the center of the vehicle, and half is behind.

In one embodiment, the lidar data is used to determine when objects are actually outside the area of interest (e.g., sufficiently outside the path of the machine) so they can be ignored and not require processing. The cell size can be varied until the radar also detects the object as being outside the area of interest. If the cell size is too large, it may indicate something just outside the area of interest is actually inside. If the cell size is too small, beyond the size required to properly detect whether an object is in the area of interest, such a smaller cell size will require much more intensive computations that aren't needed. Thus, the lidar data enables finding the right balance.

Figure 9:
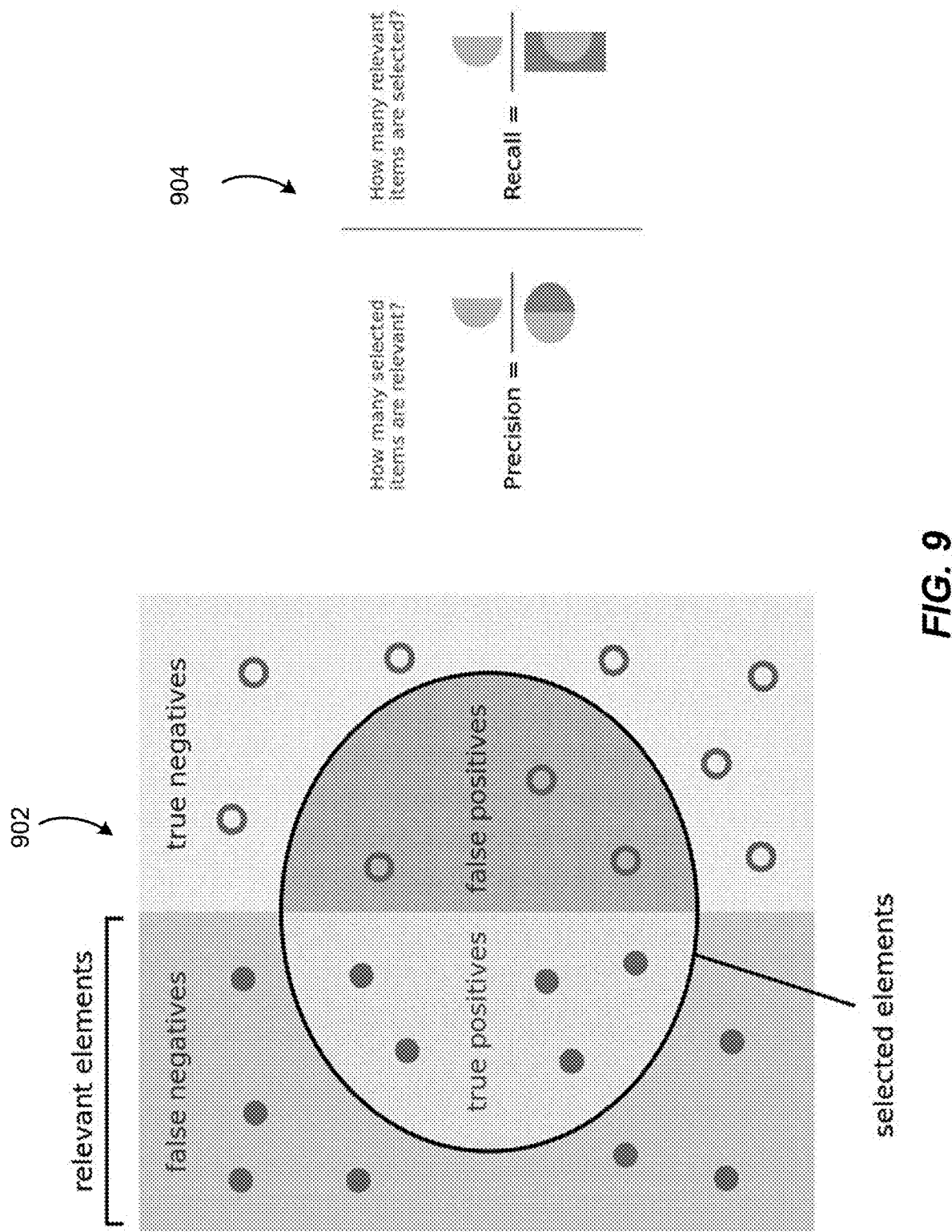
FIG. 9 is a diagram illustrating how true/false positives and negatives affect precision and recall.

FIG. 9 is a diagram illustrating how true/false positives and negatives affect precision and recall. Before discussing optimization details, it is useful to understand the metrics terms and calculation. On the left graph 902, there are four terms:

False Negatives: means missed detections. In other words, the perception system failed to see the target and the autonomous vehicle run over something, whether that's a human, or another vehicle, both are disaster scenarios. This value is of high importance s a safety critical perception system.

False positives: means false alarms. In other words, the perception system reports obstacles when there are none there, which also means vehicle could stop unnecessarily. The raw radar data usually contains lots of false positives as we saw in previous videos. If this value is too high, it would serious lower the productivity of the vehicle and no customers would want to buy the system.

True positives and true negatives are the values when the perception system sees the environment correctly.

On the right graph 904, there are two terms: Precision and Recall, which can be calculated by the 4 values on the left. A perfect Precision implies zero false positives, which means no false alarms. A perfect Recall implies zero false negatives, which means no missed detection.

Precision and recall are defined as follows:

Precision: the number of correctly identified positive results divided by the number of all positive results including those not identified correctly Recall: the number of correctly identified positive results divided by the number of all samples that should have been identified as positive.

Precision and recall are the inputs to a filter performance evaluation cost function—F1 Score. A cost function, sometimes called an error function or loss function, is a function that maps an event or values of one or more variables onto a real number intuitively representing some "cost" associated with the event. An optimization problem seeks to minimize a cost function.

The F1 score is the harmonic mean of precision and recall. The goal is to maximize both precision and recall. There is a beta factor that shifts the importance between precision and recall. In one embodiment, the beta is set to be a large number since recall is the most important value for obstacle detection In one embodiment, beta values between 1 and 10 are used. For beta=1, the same weight is on precision (false positives) and recall (false negatives). As this is a safety system, more weight is put on avoiding false negatives (missed obstacles), and thus set a beta closer to 10, corresponding with a 10-fold overweight on recall. In alternate embodiments, other values can be used, including below 1 or over 10, The traditional F-measure or balanced F-score ($F_1$ score) is the harmonic mean of precision and recall:

$$F_1 = \frac{2}{\text{recall}^{-1} + \text{precision}^{-1}} = 2 \cdot \frac{\text{precision} \cdot \text{recall}}{\text{precision} + \text{recall}} = \frac{tp}{tp + \frac{1}{2}(fp + fn)}.$$

A more general F score, $F_\beta$ uses a positive real factor $\beta$, where $\beta$ is chosen such that recall is considered $\beta$ times as important as precision, is:

$$F_\beta = (1 + \beta^2) \cdot \frac{\text{precision} \cdot \text{recall}}{(\beta^2 \cdot \text{precision}) + \text{recall}}.$$

$F_1$=1: perfect precision and recall.

$F_2$=0: either the precision or the recall is zero.

Figure 10:
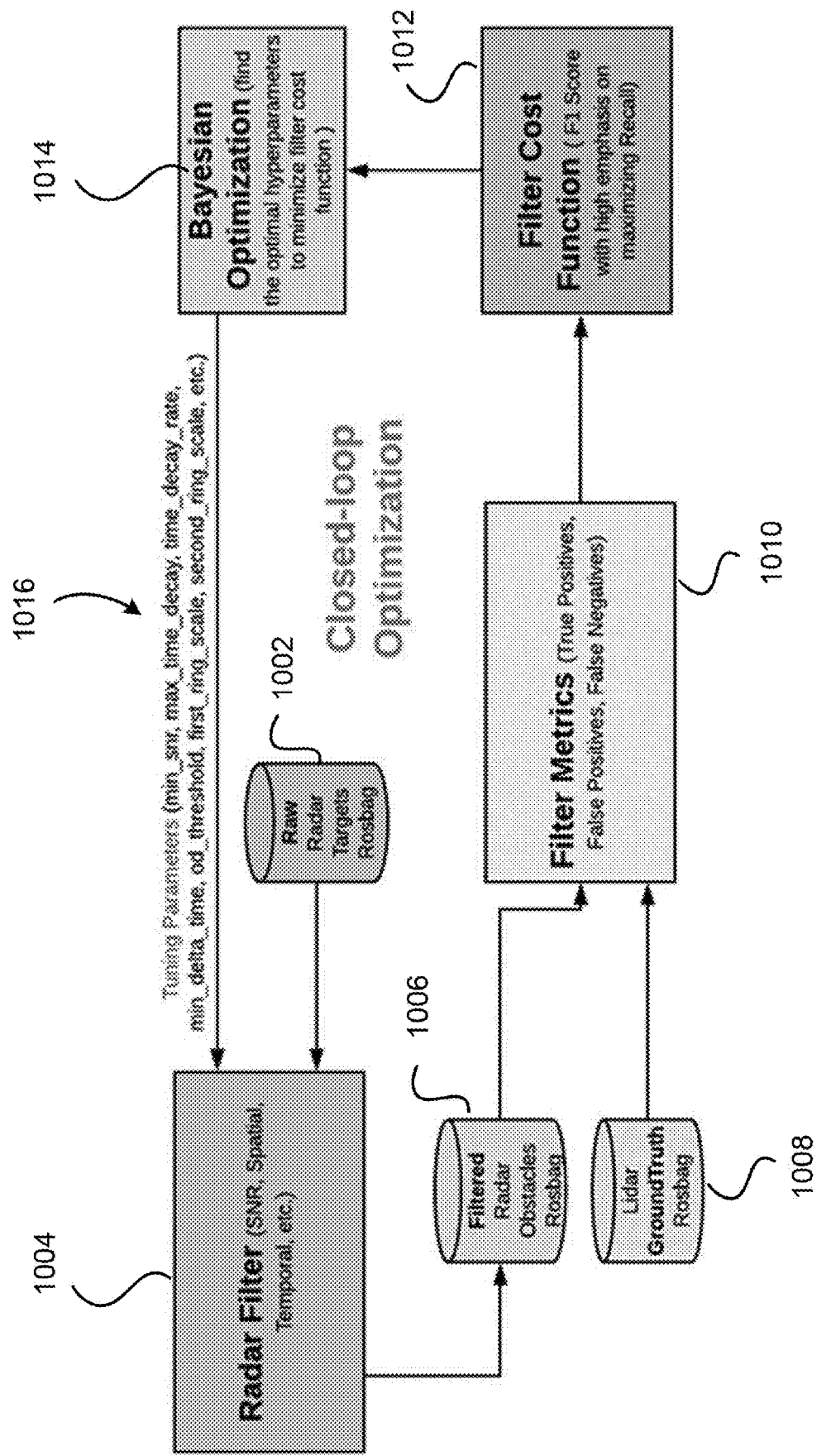
FIG. 10 is diagram illustrating an optimization framework, according to embodiments.

FIG. 10 is diagram illustrating an optimization framework. The radar sensor produces possible targets as a raw radar targets rosbag 1002. A rosbag is a file format in ROS (Robot Operating System) for storing ROS message data. The possible targets are provided to radar filtering module 1004. Filtering module 1004 contains various filters, such as a SNR filter, spatial filter, temporal filter, etc. The output is a file 1006 with filtered radar obstacles in rosbag format. Typically, the radar sensor and filter module are in a single commercial chip, such as the SmartMicro Type 153 Radar sensor.

File 1006 is compared with a Lidar ground truth rosbag from a lidar sensor, as discussed above. By comparing the two, as discussed above, filter metrics 1010 are produced, indicating the true positives, false positive and false negatives. The filter metrics are provided to a filter cost function module 1012, as described above. Filter cost function module 1012 produces an F1 score, with the beta factor set to maximize recall, as described above.

Figure 11:
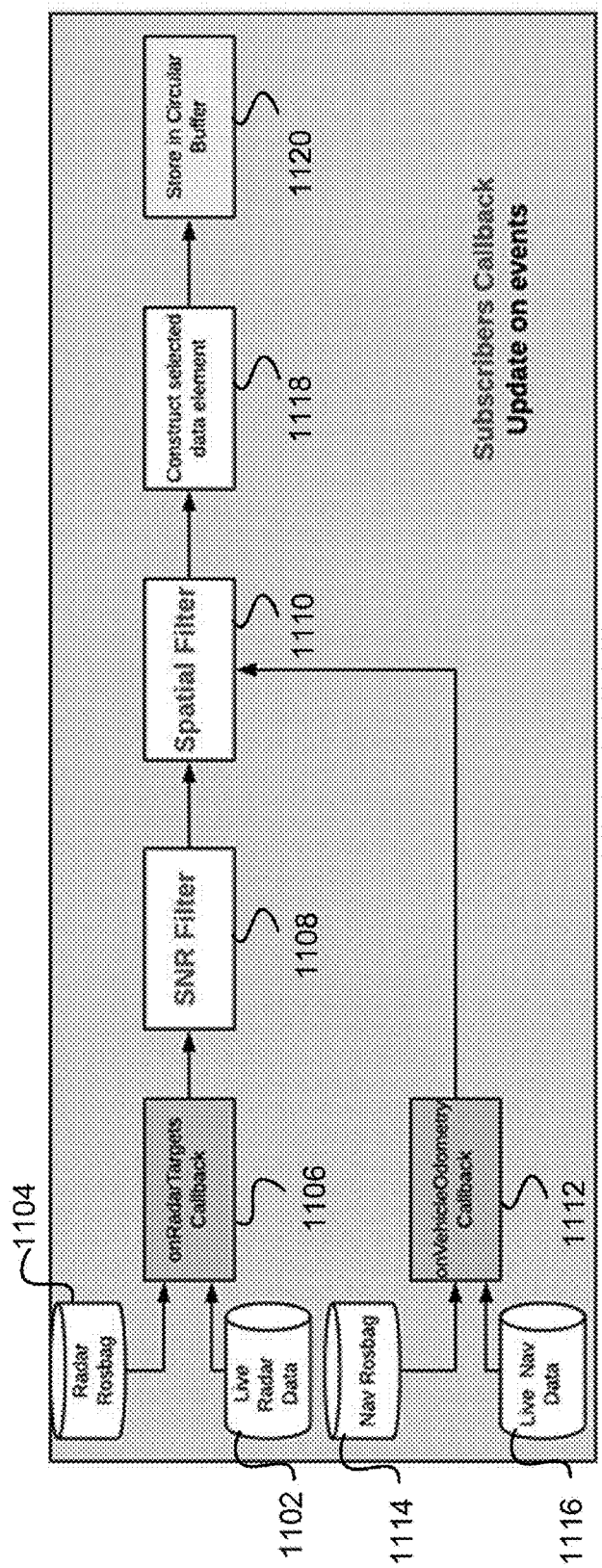
FIG. 11 is a flow diagram illustrating a subscriber's callback with processing through an SNR and spatial filter, according to embodiments.
Figure 12:
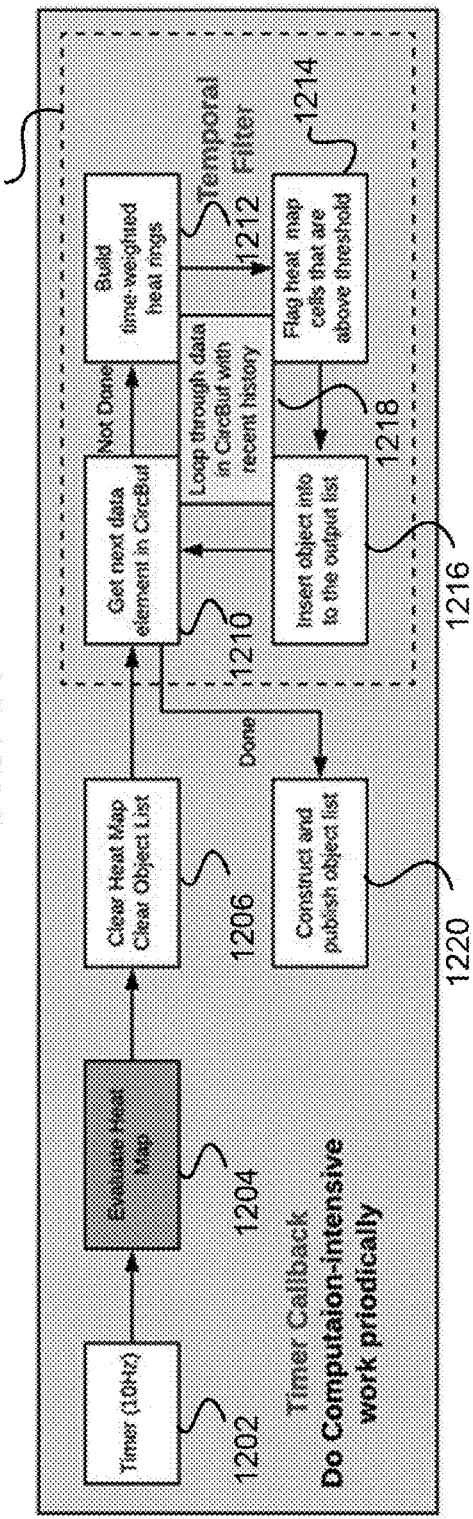
FIG. 12 is flow diagram illustrating a timer callback with processing of the SNR and spatial filtered data through a temporal filter, according to embodiments.

The F1 score from filter cost function module 1012 is provided to a Bayesian Optimization module 1014. Bayesian Optimization module 1014 takes the filter F1 score (with high emphasis on maximizing recall) to find the optimal hyperparameters 1016 that can be fed back to the filter algorithms in radar filters 1004 to minimize the filter cost function. FIGS. 11-12 illustrate how how the SNR, spatial and temporal filters work together in one embodiment to achieve the best possible performance. In alternate embodiments, the parameters can be tuned using other than Bayesian Optimization, such as by using Evolutionary Optimization, Simulated Annealing and Quadratic Optimization.

In one embodiment, the array for optimizing variables is:

```
Optimize Variables = {
    {'min_snr',          'real', [27.0, 31.5]}
    {'min_delta_time',   'real', [0.25, 0.5]}
    {'max_time_decay',   'real', [0.5, 2.0]}
    {'time_decay_rate',  'real', [0.25, 0.8]}
    {'max_distance',     'real', [30.0, 78.0]}
    {'od_threshold',     'real', [0.7, 0.99]}
    {'first_ring_scale', 'real', [0.0, 0.9]}
    {'second_ring_scale','real', [0.0, 0.8]}
};
```

Different materials will affect how much noise is present in the returns. For certain surfaces, refinement is performed on the SNR, RCS, and/or time_decay_rates.

FIG. 11 is a flow diagram illustrating a subscriber's callback with processing through an SNR and spatial filter, according to embodiments. The subscriber is the vehicle navigation system manufacturer in most cases. The flow shows a radar data pipeline running on ROS 1 framework. Live radar data 1102 and radar rosbag 1104 are processed by a radar targets callback function 1106. The identified targets are then processed through SNR filter 1108 and spatial filter 1110. The spatial filter also receives input from a vehicle odometry callback function 1112, which processes navigation rosbag 1114 and live navigation data 1116. This provides the spatial filter with updated information on the location of the vehicle. The parameters of these filters are optimized as discussed above. The output of the spatial filter is provided to a process 1118 to construct selected data elements, then store them in a circular buffer 1120. This flow provides preprocessing that largely reduce the noise and downsizes the points that need to be further processed.

FIG. 12 is flow diagram illustrating a timer callback with processing of the SNR and spatial filtered data through a temporal filter, according to embodiments. In this periodic timer callback function, computation-intensive tasks like evaluating the heat map is handled. This is where the temporal filter runs and plays the role to smooth any detection gaps. A timer 1202 periodically initiates the temporal filter heat map evaluation 1204. Upon initiation, the heat map and object list are first cleared in process 1206. Next, the temporal filter 1208 runs the looped process shown. Process 1210 obtains the next element from the circular buffer 1218, as populated by the subscriber's callback of FIG. 11. If the element has not yet been processed (not done), the next process 1212 builds time-weighted heat rings as described above with respect to FIG. 7. Next, process 1214 flags heat map cells that are above a threshold, as set by the optimized parameter. Finally, a process 1216 inserts objects into an output list. When a data element is completely processed, it is provided to a process 1220 to construct and publish filtered obstacles back to the ROS.

In embodiments, the parameters are not changed while the machine is operating. The operating data is sent to the cloud and stored, and the cloud server asynchronously does the optimizing of the data. The operating data includes data within and without the filters, so the optimizing function can vary the filter paraments for the data set and observe the effects of different filter parameters or tuning.

Figure 13:
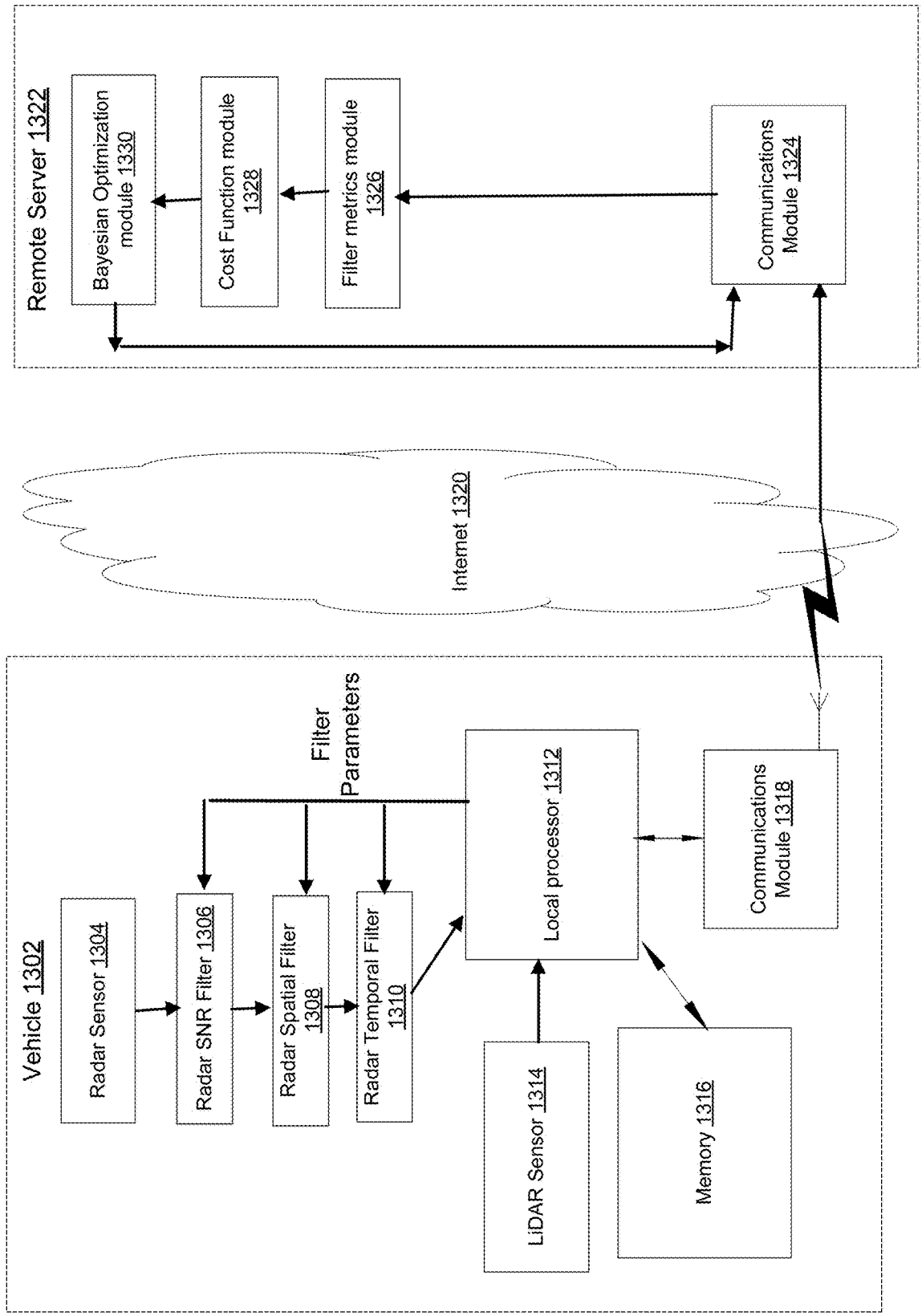
FIG. 13 is block diagram illustrating the division of processing between the vehicle processor and the cloud, according to embodiments.

FIG. 13 is block diagram illustrating the division of processing between the vehicle processor and the cloud, according to embodiments. A vehicle 1302 has at least one radar sensor 1304. The radar sensor is typically on a chip that processes radar sensor data with an SNR filter 1306, a radar spatial filter 1308 and a radar temporal filter 1310, as described above. Alternately, one or more of the filter functions could be performed in a local processor. A local processor 1312 receives this data, along with ground truth data from a lidar sensor 1314. The local processor can do other processing of the lidar and filtered radar data, depending on the power of the local processor. Alternately, the filter parameters are calculated in the cloud. Processor 1312 uses memory 1316, which can be several memories, for the programs and data.

A communications module 1318 provides the data over the internet 1320 and/or other networks, to a remote server 1322. Remote server 1322 receives the data with its own communications module 1324, and processes the data through a filter metrics module 1326, a cost function module 1328 and a Bayesian Optimization module 1330. Optimized filter parameters are then determined, and the optimized filter parameters are provided to communications module 1324, which provides them to local processor 1312 to provide to the individual filters. In alternate embodiments, some or all of the remote server processes could be performed by the local processor in the vehicle.

In alternate embodiments, some or all of the functions of remote server 1322 could be replaced by artificial intelligence. A machine learning process can be given the task of maximizing the true positives and minimizing the false negatives and false positives. It can be feed all the data, and can output the optimized parameters.

Figure 14:
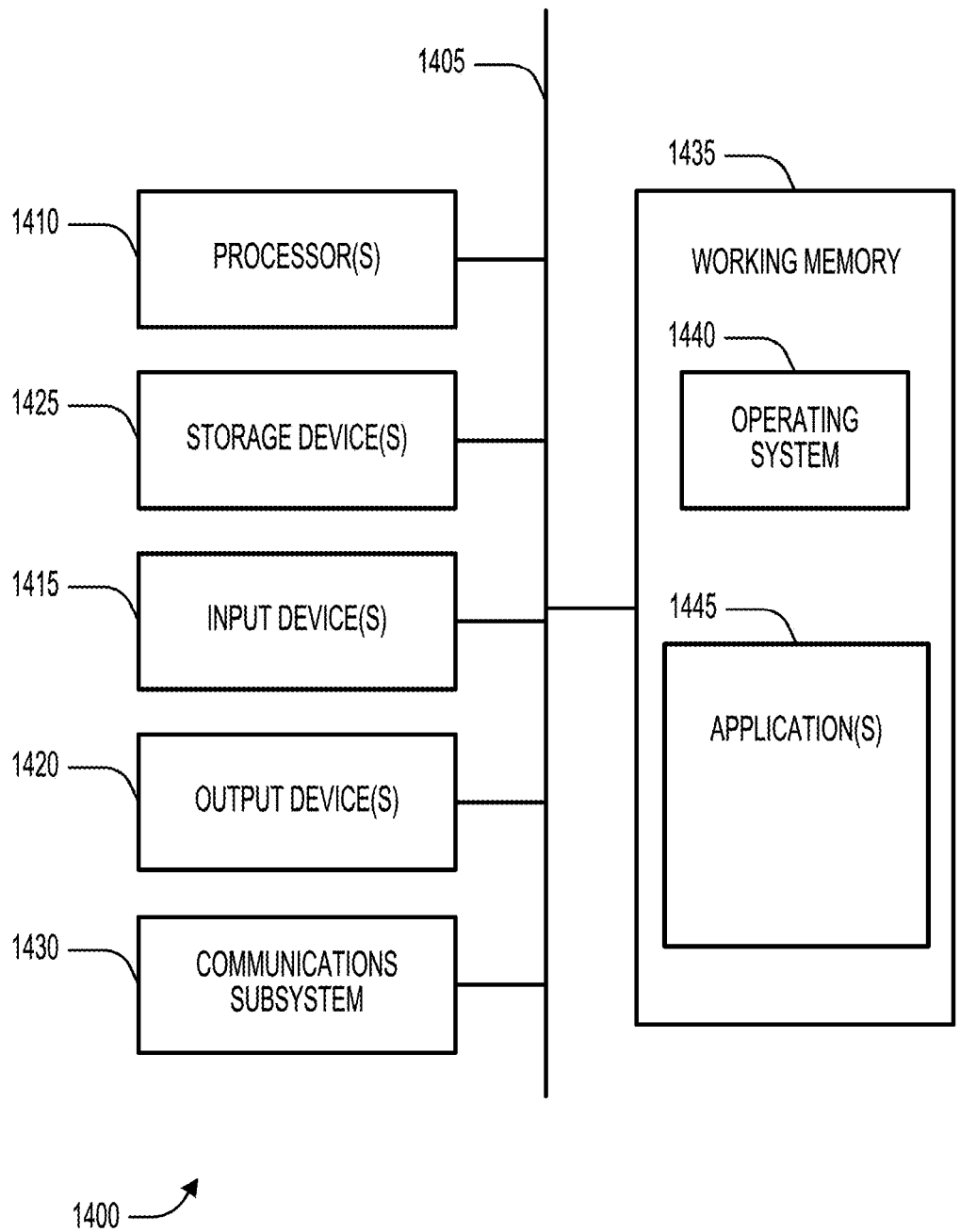
FIG. 14 illustrates a simplified computer system, according to embodiments.

FIG. 14 illustrates a simplified computer system 1400, in accordance with some embodiments of the present disclosure. FIG. 14 provides a schematic illustration of one embodiment of computer system 1400 that can perform some or all of the steps of the methods provided by various embodiments. It should be noted that FIG. 14 is meant only to provide a generalized illustration of various components, any or all of which may be utilized as appropriate. FIG. 14, therefore, broadly illustrates how individual system elements may be implemented in a relatively separated or more integrated manner.

Computer system 1400 is shown comprising hardware elements that can be electrically coupled via a bus 1405, or may otherwise be in communication, as appropriate. The hardware elements may include one or more processors 1410, including without limitation one or more general-purpose processors and/or one or more special-purpose processors such as digital signal processing chips, graphics acceleration processors, and/or the like; one or more input devices 1415, which can include, without limitation a mouse, a keyboard, a camera, and/or the like; and one or more output devices 1420, which can include, without limitation a display device, a printer, and/or the like.

Computer system 1400 may further include and/or be in communication with one or more non-transitory storage devices 1425, which can comprise, without limitation, local and/or network accessible storage, and/or can include, without limitation, a disk drive, a drive array, an optical storage device, a solid-state storage device, such as a random access memory ("RAM"), and/or a read-only memory ("ROM"), which can be programmable, flash-updateable, and/or the like. Such storage devices may be configured to implement any appropriate data stores, including without limitation, various file systems, database structures, and/or the like.

Computer system 1400 might also include a communications subsystem 1430, which can include, without limitation a modem, a network card (wireless or wired), an infrared communication device, a wireless communication device, and/or a chipset such as a Bluetooth® device, an 802.11 device, a Wi-Fi device, a WiMax device, cellular communication facilities, etc., and/or the like. The communications subsystem 1430 may include one or more input and/or output communication interfaces to permit data to be exchanged with a network such as the network described below to name one example, to other computer systems, and/or any other devices described herein. Depending on the desired functionality and/or other implementation concerns, a portable electronic device or similar device may communicate image and/or other information via the communications subsystem 1430. In other embodiments, a portable electronic device, e.g., the first electronic device, may be incorporated into computer system 1400, e.g., an electronic device as an input device 1415. In some embodiments, computer system 1400 will further comprise a working memory 1435, which can include a RAM or ROM device, as described above.

Computer system 1400 also can include software elements, shown as being currently located within the working memory 1435, including an operating system 1440, device drivers, executable libraries, and/or other code, such as one or more application programs 1445, which may comprise computer programs provided by various embodiments, and/or may be designed to implement methods, and/or configure systems, provided by other embodiments, as described herein. Merely by way of example, one or more procedures described with respect to the methods discussed above can be implemented as code and/or instructions executable by a computer and/or a processor within a computer; in an aspect, then, such code and/or instructions can be used to configure and/or adapt a general-purpose computer or other device to perform one or more operations in accordance with the described methods.

A set of these instructions and/or code may be stored on a non-transitory computer-readable storage medium, such as the storage device(s) 1425 described above. In some cases, the storage medium might be incorporated within a computer system, such as computer system 1400. In other embodiments, the storage medium might be separate from a computer system e.g., a removable medium, such as a compact disc, and/or provided in an installation package, such that the storage medium can be used to program, configure, and/or adapt a general purpose computer with the instructions/code stored thereon. These instructions might take the form of executable code, which is executable by computer system 1400 and/or might take the form of source and/or installable code, which, upon compilation and/or installation on computer system 1400 e.g., using any of a variety of generally available compilers, installation programs, compression/decompression utilities, etc., then takes the form of executable code.

It will be apparent to those skilled in the art that substantial variations may be made in accordance with specific requirements. For example, customized hardware might also be used, and/or particular elements might be implemented in hardware or software including portable software, such as applets, etc., or both. Further, connection to other computing devices such as network input/output devices may be employed.

As mentioned above, in one aspect, some embodiments may employ a computer system such as computer system 1400 to perform methods in accordance with various embodiments of the technology. According to a set of embodiments, some or all of the procedures of such methods are performed by computer system 1400 in response to processor 1410 executing one or more sequences of one or more instructions, which might be incorporated into the operating system 1440 and/or other code, such as an application program 1445, contained in the working memory 1435. Such instructions may be read into the working memory 1435 from another computer-readable medium, such as one or more of the storage device(s) 1425. Merely by way of example, execution of the sequences of instructions contained in the working memory 1435 might cause the processor(s) 1410 to perform one or more procedures of the methods described herein. Additionally, or alternatively, portions of the methods described herein may be executed through specialized hardware.

The terms "machine-readable medium" and "computer-readable medium," as used herein, refer to any medium that participates in providing data that causes a machine to operate in a specific fashion. In an embodiment implemented using computer system 1400, various computer-readable media might be involved in providing instructions/code to processor(s) 1410 for execution and/or might be used to store and/or carry such instructions/code. In many implementations, a computer-readable medium is a physical and/or tangible storage medium. Such a medium may take the form of a non-volatile media or volatile media. Non-volatile media include, for example, optical and/or magnetic disks, such as the storage device(s) 1425. Volatile media include, without limitation, dynamic memory, such as the working memory 1435.

Common forms of physical and/or tangible computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, EPROM, a FLASH-EPROM, any other memory chip or cartridge, or any other medium from which a computer can read instructions and/or code.

Various forms of computer-readable media may be involved in carrying one or more sequences of one or more instructions to the processor(s) 1410 for execution. Merely by way of example, the instructions may initially be carried on a magnetic disk and/or optical disc of a remote computer. A remote computer might load the instructions into its dynamic memory and send the instructions as signals over a transmission medium to be received and/or executed by computer system 1400.

The communications subsystem 1430 and/or components thereof generally will receive signals, and the bus 1405 then might carry the signals and/or the data, instructions, etc. carried by the signals to the working memory 1435, from which the processor(s) 1410 retrieves and executes the instructions. The instructions received by the working memory 1435 may optionally be stored on a non-transitory storage device 1425 either before or after execution by the processor(s) 1410.

The methods, systems, and devices discussed above are examples. Various configurations may omit, substitute, or add various procedures or components as appropriate. For instance, in alternative configurations, the methods may be performed in an order different from that described, and/or various stages may be added, omitted, and/or combined. Also, features described with respect to certain configurations may be combined in various other configurations. Different aspects and elements of the configurations may be combined in a similar manner. Also, technology evolves and, thus, many of the elements are examples and do not limit the scope of the disclosure or claims.

Specific details are given in the description to provide a thorough understanding of exemplary configurations including implementations. However, configurations may be practiced without these specific details. For example, well-known circuits, processes, algorithms, structures, and techniques have been shown without unnecessary detail in order to avoid obscuring the configurations. This description provides example configurations only, and does not limit the scope, applicability, or configurations of the claims. Rather, the preceding description of the configurations will provide those skilled in the art with an enabling description for implementing described techniques. Various changes may be made in the function and arrangement of elements without departing from the spirit or scope of the disclosure.

Also, configurations may be described as a process which is depicted as a schematic flowchart or block diagram. Although each may describe the operations as a sequential process, many of the operations can be performed in parallel or concurrently. In addition, the order of the operations may be rearranged. A process may have additional steps not included in the figure. Furthermore, examples of the methods may be implemented by hardware, software, firmware, middleware, microcode, hardware description languages, or any combination thereof. When implemented in software, firmware, middleware, or microcode, the program code or code segments to perform the necessary tasks may be stored in a non-transitory computer-readable medium such as a storage medium. Processors may perform the described tasks.

Having described several example configurations, various modifications, alternative constructions, and equivalents may be used without departing from the spirit of the disclosure. For example, the above elements may be components of a larger system, wherein other rules may take precedence over or otherwise modify the application of the technology. Also, a number of steps may be undertaken before, during, or after the above elements are considered. Accordingly, the above description does not bind the scope of the claims.

As used herein and in the appended claims, the singular forms "a", "an", and "the" include plural references unless the context clearly dictates otherwise. Thus, for example, reference to "a user" includes a plurality of such users, and reference to "the processor" includes reference to one or more processors and equivalents thereof known to those skilled in the art, and so forth.

Also, the words "comprise", "comprising", "contains", "containing", "include", "including", and "includes", when used in this specification and in the following claims, are intended to specify the presence of stated features, integers, components, or steps, but they do not preclude the presence or addition of one or more other features, integers, components, steps, acts, or groups.

What is claimed is:

1. A method of identifying obstacles during navigation of a moving machine, the method comprising: capturing first radar sensor data from a radar sensor;
    filtering the first radar sensor data using radar filter parameters to produce first filtered radar sensor data;
    producing first radar obstacle points from the first filtered radar sensor data;
    capturing lidar sensor data from a lidar sensor;
    producing lidar obstacle points from the lidar sensor data; and optimizing the radar filter parameters for a signal-to-noise (SNR) filter and a spatial-temporal filter using the lidar obstacle points to produce optimized radar filter parameters, wherein the optimizing is performed by sweeping through SNR parameters first, then spatial filter parameters, then temporal parameters and comprises:
    determining spatial filter bounding areas for obstacles identified by the lidar obstacle points, identifying the first radar obstacle points inside the spatial filter bounding areas as true positives, and tuning the radar filter parameters to maximize a number of true positives and produce the optimized radar filter parameters, capturing second radar sensor data from the radar sensor;
    filtering the second radar sensor data using the optimized radar filter parameters to produce second filtered radar sensor data;
    producing second radar obstacle points from the second filtered radar sensor data; and
    using the second radar obstacle points during navigation of the moving machine.

2. The method of claim 1 wherein the temporal parameters include a minimum delta time, a maximum time decay, a time decay rate, a first ring scale and a second ring scale.

3. The method of claim 1 wherein additional filter parameters include a maximum distance, a grid width, and a grid depth.

4. The method of claim 1 wherein obstacle points outside an area of interest and not within both a radar FOV and a lidar FOV are not processed.

5. The method of claim 1 wherein the optimizing includes determining a F1 score as a harmonic mean of precision and recall;
    maximizing both precision and recall; and
    applying a beta factor that shifts an importance in favor of recall.

6. The method of claim 1 wherein the radar filter parameters are optimized using one of Bayesian Optimization, Evolutionary Optimization, Simulated Annealing and Quadratic Optimization.

7. An apparatus comprising:
    a radar sensor mounted on a moving machine;
    a lidar sensor mounted on the moving machine;
    a processor mounted on the moving machine;
    a memory mounted on the moving machine and containing non-transitory, computer readable media with instructions that, when executed by a computer, perform steps comprising:
        capturing radar sensor data from a radar sensor;
        filtering the radar sensor data using radar filter parameters to produce filtered radar sensor data;
        producing radar obstacle points from the filtered radar sensor data;
        capturing lidar sensor data from a lidar sensor;

producing lidar obstacle points from the lidar sensor data; and optimizing the radar filter parameters using the lidar obstacle points to produce optimized radar filter parameters, wherein the optimizing comprises:

determining spatial filter bounding areas for obstacles identified by the lidar obstacle points;

identifying the radar obstacle points inside the spatial filter bounding areas as true positives;

tuning the radar filter parameters to maximize a number of true positives and produce the optimized radar filter parameters;

determining a F1 score as a harmonic mean of precision and recall;

maximizing both precision and recall; and applying a beta factor that shifts an importance in favor or recall;

wherein the apparatus is configured to use the optimized radar filter parameters during navigation of the moving machine.

8. The apparatus of claim 7 wherein the radar sensor filter parameters are optimized for a signal-to-noise (SNR) filter and a spatial-temporal filter.

9. (The apparatus of claim 8 wherein the optimization is performed by sweeping through SNR parameters first, then spatial filter parameters, then temporal parameters.

10. The apparatus of claim 9 wherein the temporal parameters include a minimum delta time, a maximum time decay, a time decay rate, a first ring scale and a second ring scale.

11. The apparatus of claim 9 wherein additional filter parameters include a maximum distance, a grid width, and a grid depth.

12. The apparatus of claim 7 wherein obstacle points outside an area of interest and not within both a radar FOV and a lidar FOV are not processed.

* * * * *